(12) United States Patent
Jiang et al.

(10) Patent No.: US 10,940,410 B2
(45) Date of Patent: Mar. 9, 2021

(54) FLUID PURIFICATION DEVICE

(71) Applicant: Xiamen Quanjiale New Material Technology Co., Ltd., Xiamen (CN)

(72) Inventors: Junyong Jiang, Xiamen (CN); Peizheng Li, Xiamen (CN)

(73) Assignee: XIAMEN QUANJIALE NEW MATERIAL TECHNOLOGY CO., LTD., Xiamen (CN)

( * ) Notice: Subject to any disclaimer, the term of this patent is extended or adjusted under 35 U.S.C. 154(b) by 405 days.

(21) Appl. No.: 15/921,644

(22) Filed: Mar. 14, 2018

(65) Prior Publication Data
US 2019/0099700 A1    Apr. 4, 2019

(30) Foreign Application Priority Data

Sep. 30, 2017 (CN) .......................... 201721277715.7

(51) Int. Cl.
| | |
|---|---|
| *B01D 29/58* | (2006.01) |
| *B01D 29/13* | (2006.01) |
| *B01D 39/20* | (2006.01) |
| *B01D 39/04* | (2006.01) |
| *C02F 1/00* | (2006.01) |
| *B01D 39/16* | (2006.01) |
| *E03C 1/08* | (2006.01) |
| *C02F 1/28* | (2006.01) |

(52) U.S. Cl.
CPC ............ *B01D 29/58* (2013.01); *B01D 29/13* (2013.01); *B01D 39/04* (2013.01); *B01D 39/1623* (2013.01); *B01D 39/2065* (2013.01); *C02F 1/003* (2013.01); *E03C 1/08* (2013.01); *C02F 1/283* (2013.01); *C02F 2307/06* (2013.01)

(58) Field of Classification Search
None
See application file for complete search history.

(56) References Cited

U.S. PATENT DOCUMENTS

| | | | | |
|---|---|---|---|---|
| 3,831,754 | A * | 8/1974 | Heskett | C02F 1/42 210/676 |
| 4,824,565 | A * | 4/1989 | Middleton | B01D 35/04 210/266 |
| 5,569,380 | A * | 10/1996 | Sullivan | C02F 1/003 210/266 |
| 2002/0117436 | A1 * | 8/2002 | Rajan | C02F 1/281 210/266 |

* cited by examiner

*Primary Examiner* — Jonathan M Peo (57) ABSTRACT

A fluid purification device includes a screen plate, a first filtration layer, a second filtration layer, a third filtration layer, a main body, and a dispensing plate. The screen plate has a plurality of inflow holes for filtering particles in fluid passing therethrough. Around a periphery of the screen plate, several convex sections are arranged and spaced apart from one another. The main body is hollow and has an open top and an open bottom opposite to the open top. Around an inner wall of the open top, several concave sections are arranged and spaced apart from one another. The concave section is shaped in conformity with the convex section, so that the screen plate can be secured to the open top of the main body.

4 Claims, 7 Drawing Sheets

FLUID PURIFICATION DEVICE

CROSS REFERENCE TO RELATED APPLICATIONS

This application claims priority to China Patent Application No. 201721277715.7, filed Sep. 30, 2017, in the State Intellectual Property Office of China, the content of which is incorporated herein by reference.

Technical Field

This disclosure relates to the technical field of fluid purification, more especially, to a fluid purification device for use in or with spouts or spout-ends of faucets.

Background Art

Fluid purification devices in general are relatively well-known in the art for producing purified water from ordinary tap water or the like. In such fluid purification devices or water fluid purification devices, the outflow of purified water is relatively slow, whereby the purified water outflow is typically coupled to and stored within an appropriate storage tank ready for dispensing when desired. The size of the storage tank relative to the water purification device is typically inappropriate for use in or with spouts or spout-ends of faucet, especially when there is limited space. Furthermore, additional processes in manufacturing such a water purification device will be costly.

SUMMARY

In one preferred embodiment of the present disclosure, the fluid purification device includes a screen plate, a first filtration layer, a second filtration layer, a third filtration layer, a main body, and a dispensing plate. The screen plate can have a plurality of inflow holes for filtering particles from fluid passing therethrough. Around a periphery of the screen plate, several convex sections are arranged and spaced apart from one another. The main body can be hollow and have an open top and an open bottom opposite to the open top so that the main body can allow the fluid to pass through. Around the inner wall of the open top, several concave sections are arranged and spaced apart from one another. The plurality of concave sections are shaped in conformity with the plurality of convex sections, so that the screen plate can be secured to the open top of the main body. A notch around the inner wall of the main body adjacent to the open bottom can be provided for accepting the peripheral edge of the dispensing plate and securing the dispensing plate. Several outflow holes can be arranged on the dispensing plate. Within the main body, the first filtration layer, the second filtration layer, the third filtration layer can be arranged in sequence from the screen plate to the dispensing plate.

In some embodiments, the first filtration layer and the third filtration layer are made of polypropylene cotton, and the second filtration layer is made of carbon fiber. The depth d of the first filtration layer and the third filtration layer, and the depth D of the second filtration layer can follow the relationship, $6.8\,d \leq D \leq 8.3\,d$.

In some embodiments, the first filtration layer, the second filtration layer, and the third filtration layer are neatly arranged in sequence and tightly abutted against the inner wall of the main body, so that the fluid passing through the main body will be filtered and purified by the first filtration layer, the second filtration layer, and the third filtration layer.

In some embodiments, a diameter of the inflow hole is bigger than the diameter of the outflow hole.

In some embodiments, the outflow hole has a first opening and a second opening opposite to the first opening. The first opening is arranged facing toward an interior of the main body, while the second opening is arranged facing outside the main body. A diameter of the outflow hole gradually decreases along the direction from the first opening to the second opening.

In some embodiments, the diameter of the second opening is in a range of about 0.1 mm to about 0.15 mm.

In some embodiments, the main body has a first shoulder designed around the inner wall of the main body adjacent to the open top, and a second shoulder around the inner wall adjacent to the open bottom, so that the interior of the main body is formed to have a first space, a second space, and a third space. The first space is shaped in conformity with the screen plate for accepting and securing the screen plate, and the first shoulder provides support for the screen plate. The second space is configured for accommodating the assembly of the first filtration layer, the second filtration layer, and the third filtration layer. The third filtration layer is supported by the second shoulder which partially extends radially inward from the inner wall of the main body. The notch is adjacent to the open bottom and located within the third space for separating the third filtration layer from the dispensing plate. When the dispensing plate is assembled therein, a pressure chamber is formed by the third filtration layer, the inner wall of the main body, and the dispensing plate.

In some embodiments, the plurality of outflow holes can be arranged in a pattern of multiple concentric circles around a center of the dispensing plate. Each circle can have identical number of outflow holes, and every two adjacent outflow holes in the same circle can be spaced by a regular interval.

In another preferable embodiment, the fluid purification device includes a screen plate, a main body, and a dispensing plate. The main body has a first shoulder designed around the inner wall of the main body adjacent to the open top and a second shoulder around the inner wall adjacent to the open bottom, so that the interior of the main body forms a first space, a second space, and a third space. The first space is shaped in conformity with the screen plate for accepting and securing the screen plate, and the first shoulder provides support for the screen plate. The second space is configured for accommodating a first filtration layer, a second filtration layer, a third filtration layer, and a support plate. In this case, the first filtration layer, the second filtration layer, the third filtration layer, and the support plate are arranged in a direction from the open top to the open bottom. The support plate is supported by the second shoulder which partially extends radially inward from the inner wall of the main body. The support plate can have a pattern with through holes thereon so that the fluid can pass through. The notch adjacent to the open bottom is located within the third space for separating the third filtration layer from the dispensing plate. When the dispensing plate is assembled therein, a pressure chamber is formed by the third filtration layer, the inner wall of the main body, and the dispensing plate.

In some embodiments, the second filtration layer includes three carbon plates. The three carbon plates can be spaced from one another with every two adjacent carbon plates separated by a spacer. Preferably, the spacer is designed similarly as the support plate, having a pattern with through holes thereon so the fluid can pass through.

In some embodiments, the pressure chamber formed within the main body has a depth of 2.2 cm.

BRIEF DESCRIPTION OF THE DRAWINGS

The embodiments of the disclosure will become apparent and more readily appreciated from the following description of the embodiments, taken in conjunction with the accompanying drawings. For those skilled in the art, other related drawings may also be obtained based on these drawings without any creative work. In the accompanying drawings.

DETAILED DESCRIPTION

Hereinafter, this disclosure will be described in detail in combination with the embodiments and drawings for better understanding the objective, technical solutions, and advantages of the present disclosure.

Figure 1:
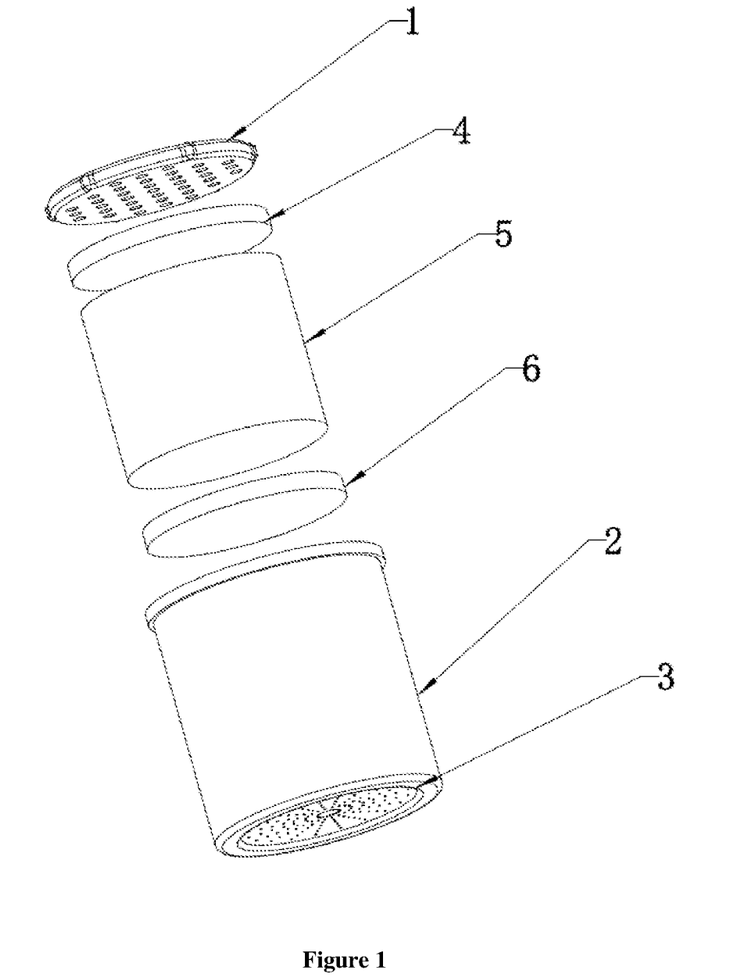
FIG. 1 is an exploded diagram of a fluid purification device according to one embodiment of the disclosure.
Figure 2:
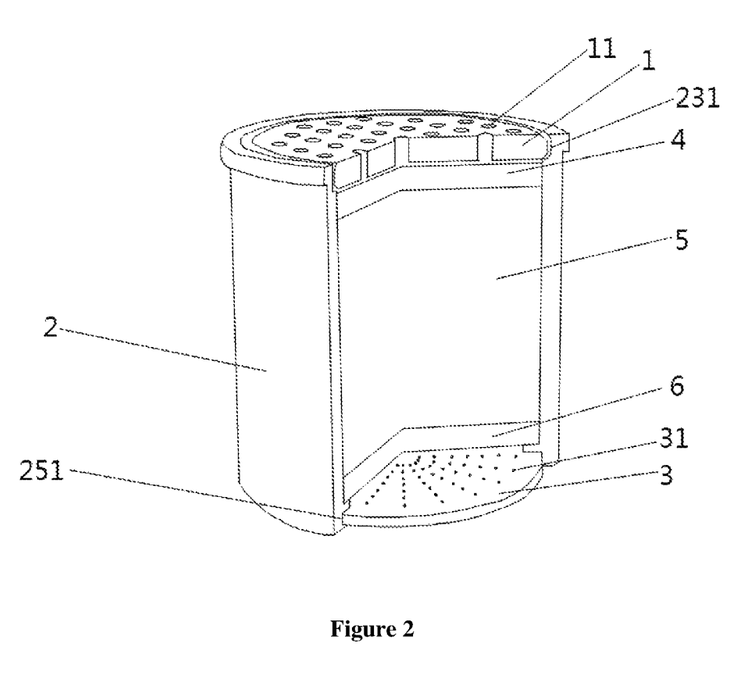
FIG. 2 is. a partial diagram of the fluid purification device according to one embodiment of the disclosure
Figure 5:
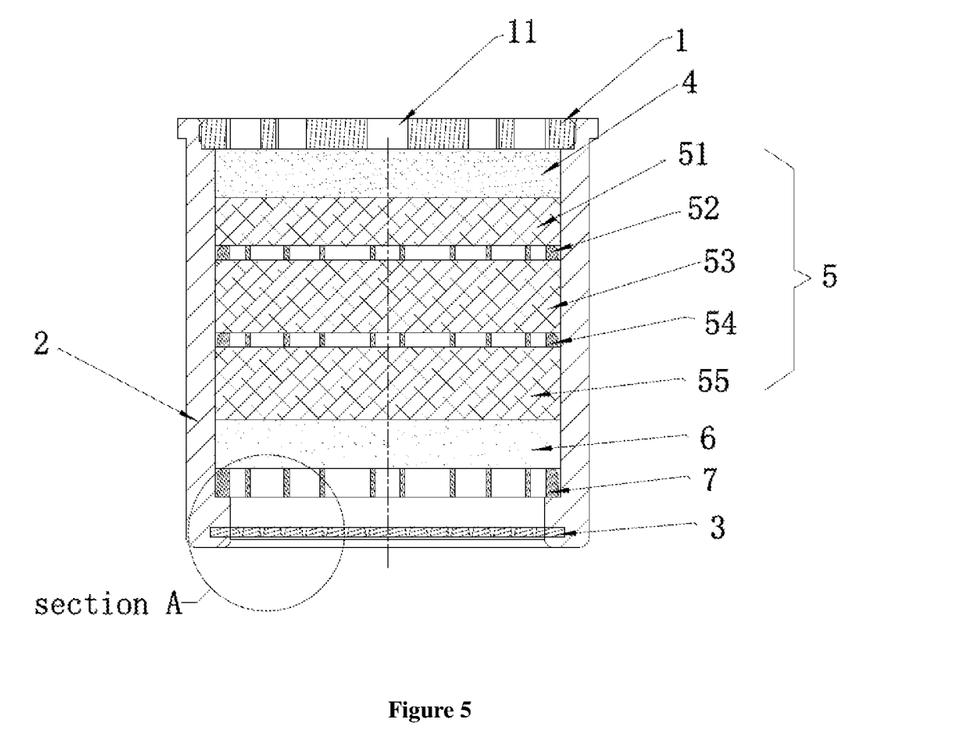
FIG. 5 is a sectional view of the fluid purification device according to one embodiment of the disclosure.
Figure 6:
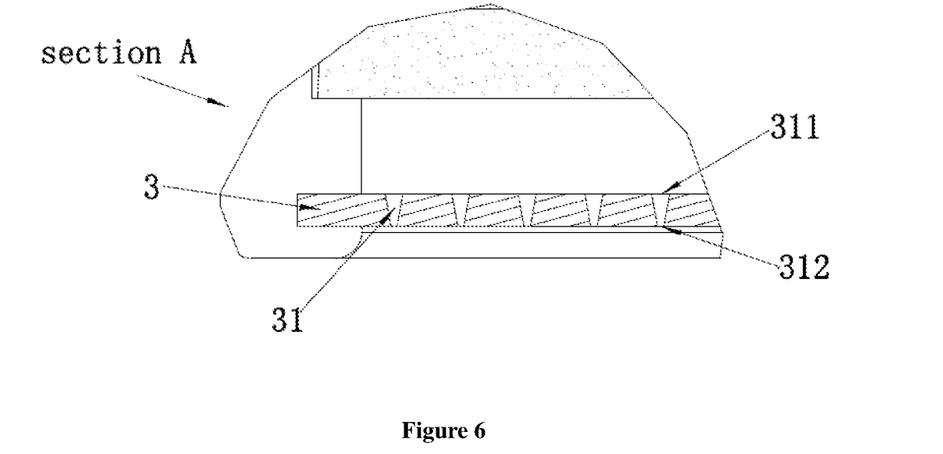
FIG. 6 is an enlarged partial view of the circled portion A of FIG. 5.
Figure 7:
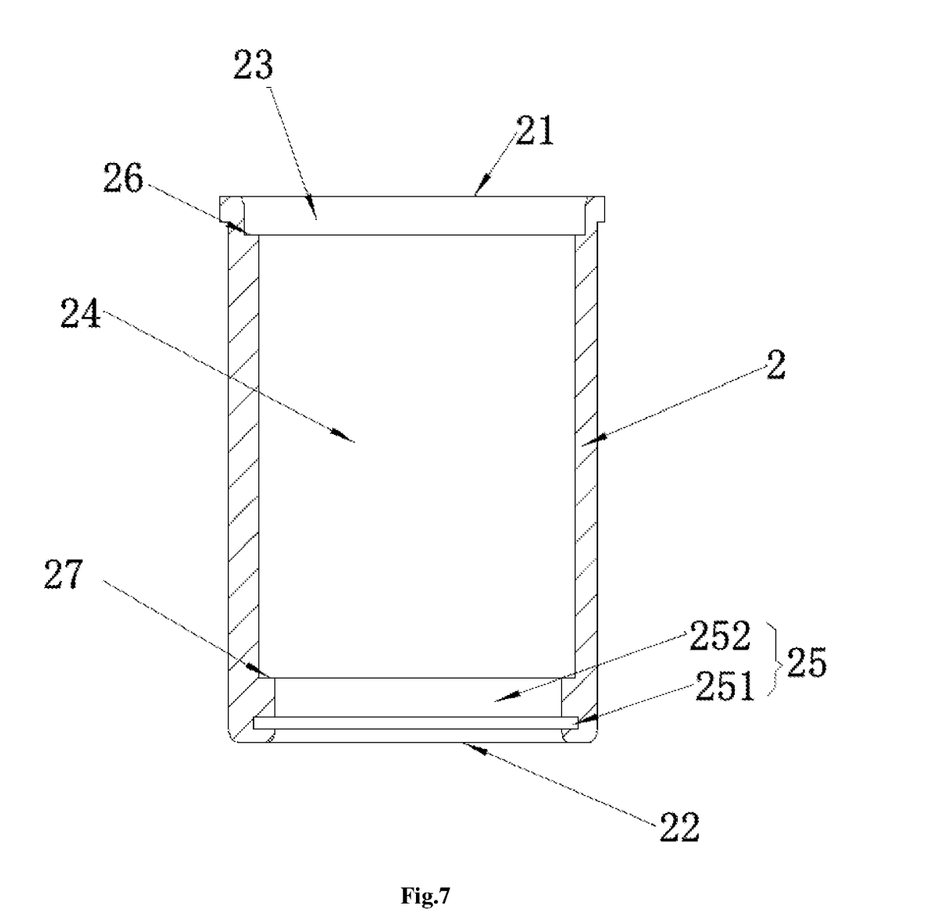
FIG. 7 is a schematic diagram of a cross section of a main body of the fluid purification device according to one embodiment of the disclosure.

With reference to FIGS. 1-7, one embodiment of a fluid purification device includes a screen plate 1, a first filtration layer 4, a second filtration layer 5, a third filtration layer 6, a main body 2, and a dispensing plate 3. The screen plate 1 has a plurality of inflow holes 11 for filtering particles in fluid passing therethrough. Around the periphery of the screen plate 1, several convex sections 12 are arranged and spaced apart from one another. As shown in FIG. 7, the main body 2 is hollow and has an open top 21 and an open bottom 22 opposite to the open top 21 so that the main body 2 can allow fluid to pass through. As shown in FIG. 2, around the inner wall of the open top 21, several concave sections 231 are arranged and spaced apart from one another. The plurality of concave sections 231 are shaped in conformity with the plurality of convex sections 12, so the screen plate 1 can be secured to the open top 21 of the main body 2. A notch 251 around an inner wall of the main body 2 adjacent to the open bottom 22 is provided for accepting a peripheral edge of the dispensing plate 3 and securing the dispensing plate 3. Several outflow holes 31 are arranged on the dispensing plate 3. Within the main body 2, the first filtration layer 4, the second filtration layer 5, and the third filtration layer 6 are arranged in sequence from the screen plate 1 to the dispensing plate 3. Preferably, a diameter of the inflow holes 11 is larger than a diameter of the outflow holes 31.

Preferably, the first filtration layer 4 and the third filtration layer 6 are made of polypropylene cotton, and the second filtration layer 5 is made of carbon fiber. As shown in FIG. 2, the second filtration layer 5 is made of carbon fiber in a single piece. However, in another embodiment, the second filtration layer 5 may be made of multiple carbon fiber plates. In one embodiment, the depth d of both the first filtration layer 4 and the depth d of the third filtration layer 6 and the depth D of the second filtration layer 5 follow the relationship, 6.8 d≤D≤8.3 d.

In one embodiment, the first filtration layer 4, the second filtration layer 5, and the third filtration layer 6 can be neatly arranged in sequence and tightly abutted against the inner wall of the main body 2, so that all the fluid passing through the main body 2 will be filtered and purified by the first filtration layer 4, the second filtration layer 5, and the third filtration layer 6.

As shown in FIGS. 5 and 6, the outflow hole 31 can have a first opening 311 and a second opening 312 opposite to the first opening 311. The first opening 311 can be arranged facing an interior of the main body 2, while the second opening 312 is arranged facing outside the main body 2. A diameter of the outflow hole 31 can gradually decrease along the direction from the first opening 311 to the second opening 312. In one example, the diameter of the outflow hole 31 gradually decreases in an outflow direction. Preferably, the diameter of the second opening 312 is in a range of about 0.1 mm to about 0.15 mm.

Referring to FIG. 7, in this embodiment, the main body 2 can have a first shoulder 26 designed around the inner wall of the main body 2 adjacent to the open top 21, and a second shoulder 27 around the inner wall of the main body 2 adjacent to the open bottom 22, so that the interior of the main body 2 has a first space 23, a second space 24, and a third space 25. The first space 23 is shaped in conformity with the screen plate 1 for accepting and securing the screen plate 1. The first shoulder 26 provides support for the screen plate 1. The second space 24 is configured for accommodating the assembly of the first filtration layer 4, the second filtration layer 5, and the third filtration layer 6. The third filtration layer 6 is supported by the second shoulder 27, which partially extends radially inward from the inner wall of the main body 2. A notch 251 is adjacent to the open bottom 22 and located within the third space 25 for separating the third filtration layer 6 from the dispensing plate 3. When the dispensing plate 3 is assembled therein, a pressure chamber 252 is formed by the third filtration layer 6, the inner wall of the main body 2, and the dispensing plate 3. Preferably, the depth of the pressure chamber 252 is about 2.2 cm. The pressure chamber provides a room for the purified fluid before it is dispensed from the dispensing plate 3. As mentioned above and shown in FIG. 6, the diameter of the first opening 311 is larger than the diameter of the second opening 322, the fluid in the pressure chamber 252 can be dispensed with more pressure. By this means, the dispensing plate 3 can increase the ejecting power of the purified fluid.

Figure 4:
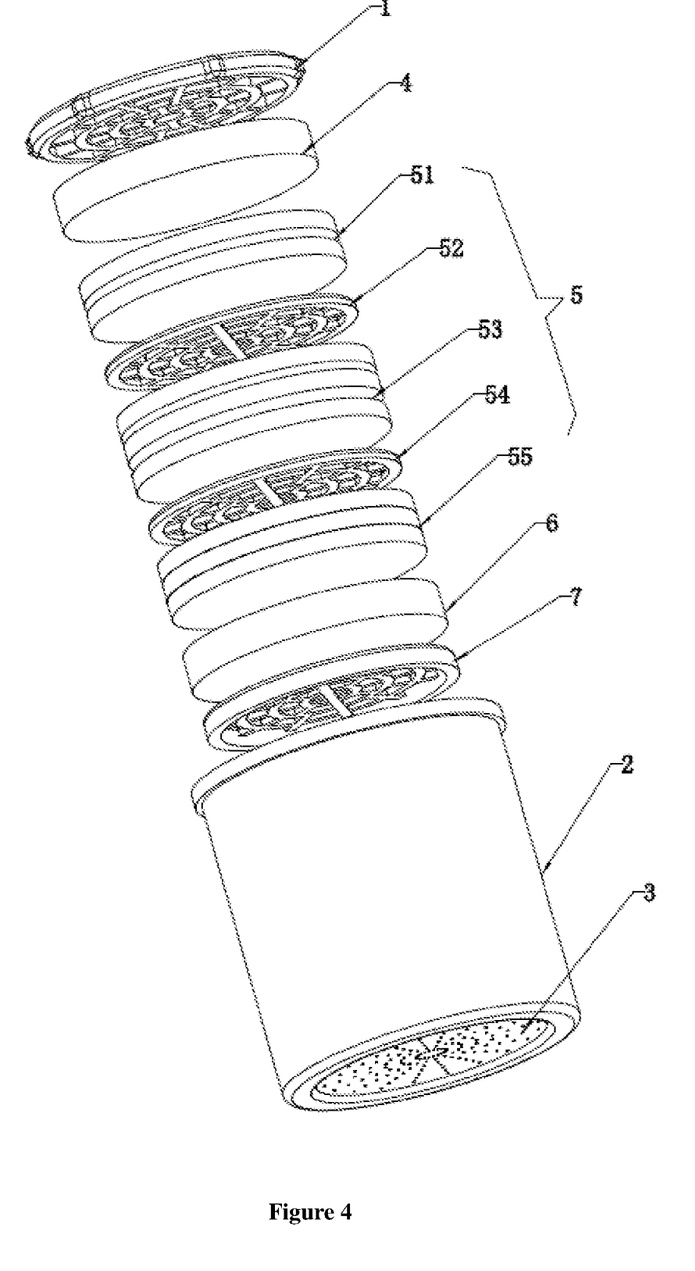
FIG. 4 is an exploded diagram of the fluid purification device according to another embodiment of the disclosure.

Referring to FIGS. 2, 4, and 6, in this embodiment, the plurality of outflow holes 31 can be arranged in a pattern of multiple concentric circles around a center of the dispensing plate 3. Each concentric circle can have an identical number of outflow holes 31, and every two adjacent outflow holes 31 in the same circle can be spaced by a regular interval.

In another embodiment, as shown in FIG. 4, the fluid purification device includes a screen plate 1, a main body 2, and a dispensing plate 3. The main body 2 has a first shoulder 26 designed around the inner wall of the main body 2 adjacent to the open top 21, and a second shoulder 27 around the inner wall adjacent to the open bottom 22, so that the interior of the main body 2 forms a first space 23, a second space 24, and a third space 25. The first space 23 is shaped for accepting and securing the screen plate 1, with the first shoulder 26 providing support for the screen plate 1. The second space 24 is configured for accommodating a first filtration layer 4, a second filtration layer 5, a third filtration layer 6, and a support plate 7. In this case, the first filtration layer 4, the second filtration layer 5, the third filtration layer 6, and the support plate 7 are arranged in sequence in a direction from the open top 21 to the open bottom 22. The support plate 7 is supported by the second shoulder 27 which partially extends inward from the inner wall of the main body 2. The support plate 7 can have a pattern with through holes thereon so that fluid can pass through. The notch 251 is adjacent to the open bottom 22 and located within the third space 25 for separating the support plate 7 from the dispensing plate 3. When the dispensing plate 3 is assembled therein, a pressure chamber 252 is formed by the support 7, the inner wall of the main body 2, and the dispensing plate 3. Preferably, the depth of the pressure is about 2.2 cm.

As shown in FIG. 5, the second filtration layer 5 may include three carbon plates 51, 53, 55. The three carbon plates 51, 53, 55 can be spaced from one another, with every two adjacent carbon plates separated by a spacer 52, 54. Preferably, the spacer 52, 54 is designed similarly as the support plate 7, and has a pattern with through holes thereon so that the fluid can pass through. It is understood that the carbon plate may be a single piece of carbon fiber or a combination of several carbon fiber pieces.

Figure 3:
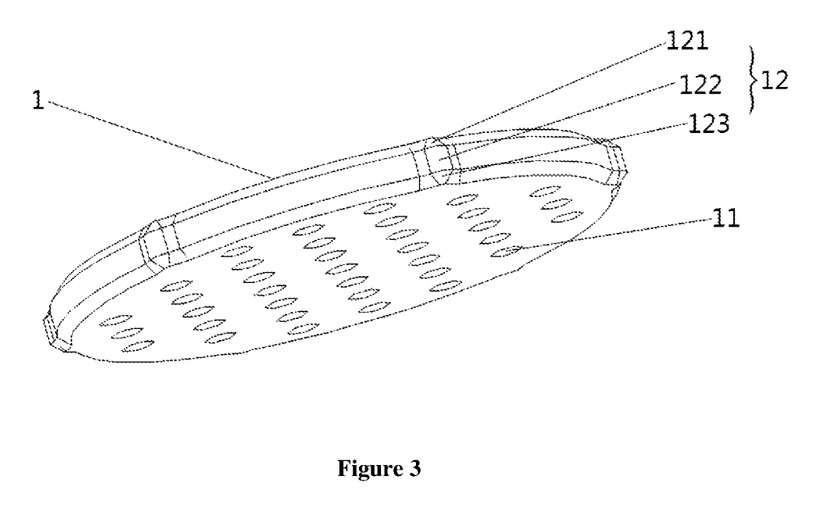
FIG. 3 is a schematic diagram of a screen plate of the fluid purification device according to one embodiment of the disclosure.

Referring to FIGS. 2 and 3, the screen plate 1 can have several convex sections 12 attached to the concave sections 231. Preferably, each of the convex sections 12 comprises a first portion 121, a second portion 122, and a third portion 123. The second portion 122 can be arranged in a line perpendicular to a cross-section of the screen plate. The first and third portions 121, 123 can be tilted to the cross-section of the screen plate, so that there is a first angle formed between the first portion 121 and the cross section of the screen plate and a second angle formed between the third portion 123 and the cross section of the screen plate. In this embodiment, the range of the first and second angles is between 115° to 125°. The concave section 231 is shaped in conformity with the convex section 12. In this embodiment the screen plate 1 is attached to the main body 2 by the engagement of the convex section 12 and the concave section 231. However, in another embodiment, the screen plate 1 may be secured to the main body by ultrasonic welding. Other manners may be used to attach the screen plate to the main body.

The above description is merely some specific embodiments of the fluid purification device. However, the scope of the present disclosure is not limited thereto. Any variation or substitution derived from the present disclosure without creative efforts falls within the scope of the present disclosure.

What is claimed is:

1. A fluid purification device, comprising a screen plate, a main body, and a dispensing plate; wherein the screen plate comprises a plurality of inflow holes for filtering particles from fluid passing therethrough;
   wherein the main body comprises a first shoulder formed around an inner wall of the main body adjacent to an open top of the main body and a second shoulder around the inner wall adjacent to an open bottom of the main body; wherein the first shoulder partially extends radially inward from the inner wall of the main body;
   wherein a plurality of convex sections are arranged around a periphery of the screen plate and spaced apart from one another; a plurality of concave sections are arranged and spaced apart from one another around the inner wall of the main body at the open top of the main body; the plurality of concave sections are shaped in conformity with the plurality of convex sections; a plurality of outflow holes are arranged on the dispensing plate for the fluid flowing out;
   an interior of the main body comprises a first space, a second space and a third space; wherein the first space is shaped in conformity with the screen plate for receiving and securing the screen plate, wherein the first shoulder provides support for the screen plate; wherein the second space is configured for accommodating a first filtration layer, a second filtration layer, a third filtration layer, and a support plate; the first filtration layer, the second filtration layer, the third filtration layer, and the support plate are arranged in sequence in a direction from the open top to the open bottom, and the first filtration layer, the second filtration layer, the third filtration layer are configured for filtering and purifying the fluid;
   wherein the support plate is supported by the second shoulder, which partially extends radially inward from the inner wall of the main body; wherein the support plate has a pattern with through holes thereon for the fluid passing therethrough;
   a notch is adjacent to the open bottom and located within the third space for separating the support plate from the dispensing plate; wherein a pressure chamber is formed by the support plate, the inner wall of the main body, and the dispensing plate.

2. The fluid purification device according to claim 1, wherein the second filtration layer comprises three carbon plates, and each adjacent carbon plate is separated by a spacer.

3. The fluid purification device according to claim 2, wherein the spacer has a pattern with through holes thereon for enabling the fluid to pass therethrough.

4. The fluid purification device according to claim 1, wherein the pressure chamber formed within the main body has a depth of 2.2 cm.

* * * * *